United States Patent [19]
Williams et al.

[11] Patent Number: 5,543,388
[45] Date of Patent: Aug. 6, 1996

[54] INTENSIFIED CORROSION INHIBITOR AND METHOD OF USE

[75] Inventors: Dennis A. Williams; Lee A. McDougall, both of Houston; James R. Looney, Brady, all of Tex.

[73] Assignee: Exxon Chemical Patents Inc., Linden, N.J.

[21] Appl. No.: 103,064

[22] Filed: Aug. 5, 1993

[51] Int. Cl.$^6$ ............................................. F21B 43/27
[52] U.S. Cl. ................. 507/269; 507/939; 507/933; 507/934; 507/277
[58] Field of Search ........................ 252/389.54, 390, 252/392; 507/263, 240, 933, 277; 5/939, 934, 269

[56] References Cited

U.S. PATENT DOCUMENTS

| | | | |
|---|---|---|---|
| 2,567,156 | 9/1951 | Malowan | 252/389.62 |
| 4,498,997 | 2/1985 | Walker | 252/389.52 |
| 4,522,658 | 6/1985 | Walker | 252/389.52 |
| 4,552,672 | 11/1985 | Walker | 252/389.52 |
| 4,646,835 | 3/1987 | Watkins et al. | 507/234 X |
| 5,120,471 | 6/1992 | Jasinski et al. | 507/263 X |

FOREIGN PATENT DOCUMENTS 1216498  12/1970  United Kingdom.

*Primary Examiner*—Sharon Gibson
*Assistant Examiner*—Valerie D. Fee
*Attorney, Agent, or Firm*—R. L. Graham

[57] ABSTRACT

Elemental iodine is used to improve the performance of conventional corrosional inhibitors in oil field acidizing operations. The iodine, because of its solubility, may be used in a formulation which includes a corrosion inhibitor and surfactants dissolved in a suitable organic solvent.

12 Claims, No Drawings

INTENSIFIED CORROSION INHIBITOR AND METHOD OF USE

BACKGROUND OF THE INVENTION

This invention relates generally to corrosion inhibitors and more specifically to the use of additives for extending the effectiveness of acid corrosion inhibitors, particularly in oil field acidizing operations.

DESCRIPTION OF THE PRIOR ART

Acids and acid solutions have long been used in the stimulation of oil wells, gas wells, water wells, and similar boreholes. Acid stimulation is performed in wells completed in subterranean formations. Acid stimulation is used in conjunction with hydraulic fracturing techniques and matrix acid stimulation techniques. In both acid fracturing and matrix acid stimulation, the well treating acid solutions, usually HCl, HF, or mixtures thereof, are pumped through the well tubular goods and injected into the formation where the acid attacks formation materials increasing its permeability to oil and/or gas.

In order to protect the equipment and tubular goods from the corrosive effects of the acid, the well treating acid almost always includes a corrosion inhibitor, frequently referred to as ACI's. Such corrosion inhibitors include nitrogen containing compounds such as those described in H751, U.S. Pat. No. 4,028,268; acetylenic compounds as described in U.S. Pat. Nos. 3,779,935, 4,552,672, 4,498,997, 4,444,668, and 4,522,658; and mixtures thereof.

Other components of acid corrosion inhibitors include aromatic solvents, alcohols (MeOH, IPA, butanol, etc.), organic sulfur compounds, terpinols, and surfactants (non-ionic, cationic, anionic, or amphoteric).

Acid corrosion inhibitors also include arsenic compound (U.S. Pat. No. 1,887,504) as an anodic inhibitor; phenyl ketones (U.S. Pat. No. 5,120,471); alpha, beta—unsaturated aldehydes (U.S. Pat. No. 4,734,259, including derivatives of cinnamic aldehyde (U.S. Pat. No. 3,589,860); and alkenyl phenones (EP Appl. 0 276 879, EP Appl. 0 278 543, and U.S. Pat. No. 5,013,483.

Recent developments have demonstrated the usefulness of acid corrosion inhibitor complexes derived from an ammonium quaternary compound and a metal ion as described in U.S. Pat. No. 5,002,673.

In order to extend the effectiveness of the acid corrosion inhibitors, the literature suggests the use of additives, specifically metal salts of iodine and chlorine as disclosed in U.S. Pat. Nos., 3,773,465; 4,871,024; and 4,997,040. U.S. Pat. No. 3,773,465 discloses a number of metal salts of iodine and chlorine but states that cuprous iodide is more effective than the other compounds tested. It should also be noted that U.S. Pat. No. 3,773,465 discloses that it is undesirable to generate free iodine along with $Cu_2I_2$ produced by in situ reaction since the degree of improvement is smaller.

U.S. Pat. No. 4,871,024 discloses cuprous chloride as an extender for acid corrosion inhibitors when acidizing through high chrome alloy steel tubulars. U.S. Pat. No. 4,997,040 discloses acid corrosion inhibitor extenders in the form of $CuCl$, $HgCl_2$, $SbCl_3$, and $BiCl_3$, with the $HgCl_2$ extenders being the most effective.

To summarize the state-of-the-art for the acid corrosion inhibitor extenders, all are in the form of ions (metal ions and $Cl^-$ and $I^-$ ions). One of the problems encountered in using the ionizable salts is that they are not compatible with organic based corrosion inhibitor formulations. The metal chlorides or iodide salts are not soluble in the organic liquids used in corrosion inhibitor formulations.

Another known ACI extender is formic acid, commonly used with amine and quaternary ammonium type ACI formulations. Also U.S. Pat. No. 3,779,935 discloses the use of formamide as an extender for organic based inhibitors and is capable of being formulated into the ACI formation.

SUMMARY OF THE INVENTION

An intensified corrosion inhibitor formulation of the present invention comprises the following components:

(a) an organic solvent;

(b) an organic corrosion inhibitor dissolved or dispersed in the solvent; and (c) an effective amount of elemental iodine ($I_2$) dissolved or dispersed in the solvent for extending or intensifying the inhibiting effect of the corrosion inhibitor.

In a preferred embodiment, the formulation will also include a surfactant for dispersing the inhibitor and iodine in the aqueous acid solution used in the oil field acidizing operations.

The corrosion inhibitor formulation is introduced into the well treating acid at a concentration sufficient to coat the well tubulars and equipment. The concentration of the formulation in the acid solution should generally be sufficient to provide the acid solution with at least 0.05 wt % of the corrosion inhibitor (actives) and at least 0.001 wt % of the iodine. The upper limit of these actives will be controlled by economics. Generally speaking, from about 0.2 to 20 wt % of the formulation in the acid solution will provide satisfactory protection for the well tubulars.

The method of the present invention employs the formulation described above in the acidizing of wells.

The formulation of the present invention features the use of elemental iodine as an extender or intensifier of the known acidizing corrosion inhibitors (i.e. acetylenic inhibitors, quaternary ammonium inhibitors (including metal complexes thereof), amide inhibitors, amine inhibitors, imidazoline inhibitors, alkenyl phenone inhibitors, and cinnamaldehyde). Tests have shown that iodine not only is an effective extender, but can readily be incorporated in the formulation which is easily dispersed in the acid solution. Although the iodine is preferably incorporated in the ACI formulation, it can be added separately to the acid solution.

DESCRIPTION OF PREFERRED EMBODIMENTS

As indicated above, the formulation of the present invention comprises three principal compounds. Each of these compounds, as well as the acid solution in which they are used, are described below.

Aqueous Acid Solutions: Any of the known oil field acids may be used. These are referred to herein as "well treating acids" and include aqueous solutions of hydrochloric acid (HCl), hydrofluoric acid (HF), mixtures of HCl and HF (i.e. mud acid), acetic acid, formic acid, and other organic acids and anhydrides. The most common acids are 3% HCl, 7–½% HCl, 15% HCl, 28% HCl, and blends of HCl and HF (mud acid). Mud acid is normally a blend of 6 to 12% of HCl and 1½ to 6% HF.

Corrosion Inhibitors: Any of the known ACI's may be used in the formulation. These include the acetylenic, quaternary ammonia compounds, unsaturated aldehydes, alkynol phenones, and amines. The known ACI's are described below:

(1) Acetylenic alcohol: The acetylenic alcohols employed in the present invention may suitably include ethyl octynol, propargyl alcohol, hexynol and other acetylenic alcohols having the structural formula:

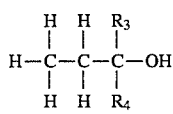

where $R_3$ is selected from the group consisting of $CH_3$ and H and $R_4$ is selected from the group consisting of hydrogen, alkyl groups having 1 to 18 carbon atoms, naphthyl, phenyl, and alkyl substituted phenyls having 1 to 10 carbon atoms in the alkyl substituent. Examples of such alcohols include: methyl butanol, methyl pentynol, hexynol, ethyl octynol, propargyl alcohol, benzyl butanol, naphthyl butanol, and the like. Acetylenic alcohols which have 3 to 10 carbon atoms are preferred.

(2) Quaternary Compounds: The quaternary ammonium compounds (referred to as "quaternary" herein) employed in the present invention comprise aromatic nitrogen compounds which may be illustrated by alkyl pyridine-N-methyl chloride quaternary, alkyl pyridine-N-benzyl chloride quaternary, quinoline-N-methyl chloride quaternary, quinoline-N-benzyl chloride quaternary, quino-line-N-(chloro-benzyl chloride) quaternary, isoquinoline quaternaries, benzoquinoline quaternaries, chloromethyl naphthalene quaternaries and admixtures of such compounds, and the like. The quaternary compounds may also be coupled with a metal compound such as described in U.S. Pat. Nos. 5,002,673; 5,089,153; 5,130,034; 5,200,096; and 5,209,859, the disclosures of which are incorporated herein by reference.

(3) The alpha-, Beta- Unsaturated Aldehydes and Alkenylphenones: Compounds of this class found to be useful as components of acid corrosion inhibitors comprise those listed in U.S. Pat. No. 4,734,259 (Col. 3 and 4), and U.S. Pat. No. 5,013,483 (Col. 2, 3, and 4). A particularly preferred aldehyde ACI is cinnamaldehyde ACI.

(4) Amines: Compounds of this class comprise amines, amides, and imidazolines. Examples of amines include alkyl amines; cyclic amines such as alkyl pyridines; crude quinolines; (fatty polyamines such as tallow diamine); aromatic amines such as aniline; and derivatives of these amines. Examples of preferred amides include fatty acid polyamines such as tall oil fatty acid reacted with triethylene tetramine in a 1:1 mole ratio; tallow fatty acid reacted with tetraethylene penta amine in a 1:1 mole ratio; or derivatives of this class of compounds. An example of an imidazoline ACI includes tall oil fatty acid reacted with triethylene tetramine (and derivatives thereof) such as those described in copending U.S. application Ser. No. 962,464 filed on October 15, 1992, the disclosure of which is incorporated herein by reference.

Extender: The extender for the above ACI's is iodine. Iodine is a bluish, black, lustrous solid. It sublimes at ambient temperatures to give a blue-violet gas with an irritating odor. Elemental iodine exhibits some metallic-like properties. It is readily soluble in halogenated solvents such as chloroform; aromatic solvents such as benzene; glacial acetic acid; ethanol, methanol, isopropanol, carbon disulfide; glycerine; ether; and polar aprotic solvents such as dimethyl formamide. It is only slightly soluble in water (0.03 wt %); but can form soluble complexes ($I_3$, $I_5$, or $I_7$) with iodide salts such as KI. Iodine is further described in the *Handbook of Chemistry and Physics,* published by the Chemical Rubber Co., Cleveland, Ohio, and Advanced Inorganic Chemistry; Cotton & Wilkenson; Interscience Publishers, John Wiley & Sons, New York, the disclosure of which is incorporated herein by reference.

Solvent: The solvent useable in the formulation is an organic liquid selected from polar aprotic solvents, aromatic solvents, terpinols, and alcohols. Solvent includes polar aprotic dimethyl formamide (DMF), dimethylsulfoxide (DMSO), dimethylacetamide (DMA), 1-methyl-2-pyrrolidone ("pyrrolidone"), tetramethylene sulfone ("sulfolane"), and mixtures thereof. The aprotic solvent (e.g. DMF, DMSO, DMA, pyrrolidone, and sulfolane) may be blended with alcohol and/or aromatic solvents. The aromatic solvents include heavy aromatic naptha, xylene, toluene, and others as described in U.S. Pat. No. 4,498,997. Also included are alkenyl phenones (U.S. Pat. No. 5,013,483) and alpha-, Beta- Unsaturated aldehydes (U.S. Pat. No. 4,734,259). The alcohols include: methanol, ethanol (U.S. Pat. No. 4,734,259), propanol, isopropanol, n-butanol, isobutanol, ethylene glycol, diethylene glycol, monobutyl ether of ethylene glycol, glycerine and the like.

Other Additives): It is preferred but not essential that the formulation include a dispersant (for metal ion/quaternary complexes), a surfactant, and a co-extender such as formic acid.

In order to disperse the components of the formulation in aqueous acid, it has been found desirable to employ an organic amine (including aromatic amines, aliphatic amines, and heterocyclic amines) dispersant. The preferred dispersants are aminophenol, aniline, chloroaniline, toluidine, diphenyl amine, pico-line, alkyl pyridine, or n-octylamine.

The surfactant serves to wet the tubular goods to permit filming of the acid corrosion inhibitor components. The preferred surfactants are the nonionics having hydrophilic-lipophilic balance (HLB) numbers of 1 to 18, preferably 3 to 16 such as laureates, stearates, and oleates. Nonionic surfactants include the polyoxyethylene surfactants, (such as ethoxylated alkyl phenols, ethoxylated aliphatic alcohols), poly-ethylene glycol esters of fatty, resin, and tall oil acids. Examples of such surfactants are poly-oxyethylene alkyl phenol wherein the alkyl group is linear or branched $C_8$–$C_{12}$ and contains above about 60 wt % poly oxyethylene. Octyl and nonyl phenols containing 9 to 15 moles ethylene oxide per mole hydrophobe are the preferred ethoxylated alkyl phenol surfactants.

The polyoxyethylene ester of fatty acids include the mono and dioleates and sesquioleates wherein the molecular wt of the esterified polyethylene glycol is between about 200 and 1,000.

Other surfactants which are also useful include cationic amines, quaternary amines, amphoterics, anionic sulfates, anionic sulfonates, and alkoxylated alkylphenol resins. Polyoxyethylene sorbitan oleates are also useable.

In practice, the nonionics may be blended to provide the desired properties. A particularly useful surfactant is a blend of polyethylene glycol esters of fatty acids and ethoxylated alkylphenols.

The formic acid compound may be selected from the esters and amides of formic acid. The formic acid compound may be from the group consisting of formate esters of the structure:

HCOOR where R is a monoaryl group, an alkyl group having 1 to 6 carbon atoms, cyclo-alkyl residues having 5 to 6 carbon atoms, alkenyl and alkynyl groups having 2 to 6 carbon atoms which may contain functional groupings selected from ——C——OH, ——OH, ══C══O, ——COOH, ——SH, and $NH_3$ and formamides of the structure:

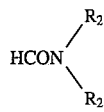

where $R_2$ is independently hydrogen, a phenyl group, an alkyl group having 1 to 6 carbon atoms, cyclo-alkyl residues having 5 to 6 carbon atoms, alkenyl and alkynyl groups having 2 to 6 carbon atoms which may contain functional groupings selected from —COH, —OH, =C=O, —COOH, —SH, and —$NH_2$. Examples of the formic acid compound are: methyl formate, ethyl formate, benzyl formate, other alkyl and aryl formates, and the like. Other examples include formamide, dimethyl formamide, formaniline, and the like. Mixtures of the esters and mixtures of the amides may be used.

Preparation of the Formulation: The preparation of the formulation will depend on the ACI used with the iodine extender. Representative formulations are described below.

With the acetylenic, amine, amide and quaternary ACI's, the components (i.e. corrosion inhibitor, iodine extender, and other optional additives such as surfactant, formic acid, and dispersants) may be blended into an organic solvent to form the formulation.

With metal ion/quaternary complexes the preparation of the formulation is somewhat more involved, because of the necessity to produce the complex. The quaternary and metal salt may be complexed in a suitable solvent followed by the addition of the extenders and other optional additives. Alternatively, the iodine may be first dissolved in the solvent followed by the complexing step.

Regardless of the method of preparation, the formulation should have the following composition (wt %) ranges, which are interchangeable:

| Component | Broad Range | Preferred Range | Best Mode |
|---|---|---|---|
| Corrosion Inhibitor | 10–50 | 20–40 | 75–35 |
| Iodine | 0.5–10 | 1–5 | 1–3 |
| Solvent[1] | 5–90 | 5–80 | 10–60 |
| Other Additives: | | | |
| formic acid | 0–40 | 5–30 | 10–20 |
| surfactant | 0–40 | 5–30 | 10–25 |
| dispersant | 0–20 | 0–10 | 1–5 |

[1]Solvent can be provided by certain surfactants and dispersants, such that a single liquid may have a dual function.

An alternative preparation procedure is to dissolve certain components in one solvent and other components in a separate batch, using the same or different solvent. For example, the ACI package can be prepared by dissolving the ACI and certain additives, whereas the iodine alone or with other additives can be dissolved in a second package. The contents of the two packages can be added to the acid solution at the well site. Iodine may also be added directly to the acid solution.

Operation: In operation, the formulation comprising the three principal components (preferably with the surfactant) may be premixed, prepackaged, and transported to the well site ready for use.

The concentration of the formulation in the well treating acid, of course, should be sufficient to provide protection to the metal (e.g. steel or chrome alloys) tubulars against corrosion. The concentration of the formulation will depend on the temperature of the well, the exposure time of the tubulars to the acid solution, the type of acid, and type of metal alloy. As mentioned above, the concentration of the ACI (actives) in the acid solution should be between 0.1 to 20 wt %, preferably 0.1 to 10 wt %, and more preferably 0.1 to 5 wt %.

EXPERIMENTS

In order to demonstrate the effectiveness of the acid corrosion inhibitors (ACI) of the present invention, a formulation sample was prepared using the following components:

| ACI Components | Concentration (wt %) |
|---|---|
| Quaternary Compound[1] | 36 |
| Surfactant: | 16 |
| Solvent: | 60–62 |
| Iodine: | 0–2 |

[1]Quinoline-N-benzyl chloride quaternary

The above components were mixed in the solvent to provide the indicated concentrations. Additional sample formulations were prepared without any extender or with KI as the extender.

Each sample formulation was added to an aqueous acid solution. Corrosion tests using N-80 tubing steel coupons and CR 2205 (API Specification Grade Duplex containing 21.9 wt % chromium) coupons were run at the following conditions:

| | Test Nos. 1–5 | Test Nos. 6–14 | Test Nos. 15–22 |
|---|---|---|---|
| Temp. (°F.) | 275 | 275 | 200 |
| Length (Hrs.) | 6 | 6 | 6 |
| Pressure (psi) | 700 | 3,000 | atm. |
| Agitation | None | Reciprocating | None |
| Acid Volume (ml) | 100 | 100 | 100 |

The ACI formulation (actives 36 wt %) concentration in the acid solution was 1 vol %.

The test data are presented on Tables I, II, and III with corrosion rate in pound metal loss/ft².

TABLE I

| Test No. | Formulation | Acid | Corrosion Rate | Comments |
|---|---|---|---|---|
| 1 | ACI with $I_2$ 2 wt % $I_2$ | Mud[1] | 0.035 | |
| 2 | ACI | Mud[1] | 0.033 | .026 g. KI added directly to acid |
| 3 | ACI | Mud[1] | 0.073 | 0.02 g. $I_2$ added directly to acid solution |
| 4 | ACI | Mud[1] | 0.076 | No iodine |
| 5 | ACI with 2.6 wt % KI | Mud[1] | 0.045 | KI not dispersed |

[1]Mud acid - 12/3% HCl/HF

Table I data reveals that $I_2$ in the ACI formulation was effective, but $I_2$ added directly to the acid solution (Test No. 3) was not an effective extender. Conversely the direct addition of KI to the acid solution (Test No. 2) was effective, whereas KI added to the ACI formulation (Test No. 5) was not effective.

Additional corrosion coupon tests were carried out comparing the performance of $I_2$ (2 wt%) and KI (2.6 wt%) in the ACI formulations. Table II presents these data.

TABLE II

| Other Test No. | Inhibitor | Conc. Vol. % | Acid | Coupon | Corrosion Rate | FormicAcid (Vol. %) In Acid Solution |
|---|---|---|---|---|---|---|
| 6 | ACI w/$I_2$ | 1.0 | 15% HCl | Cr 13 | 0.018 | 5 |
| 7 | ACI | 1.0 | 15% HCl | Cr 13 | 0.041 | 5 |
| 8 | ACI w/$I_2$ | 1.0 | Mud | Cr 13 | 0.048 | 5 |
| 9 | ACI | 1.0 | Mud | Cr 13 | 0.064 | 5 |
| 10 | ACI w/$I_2$ | 2.0 | 28% HCl | Cr 13 | 0.029 | 6 |
| 11 | ACI | 2.0 | 28% HCl | Cr 13 | 0.030 | 6 |
| 12 | ACI w/KI | 1.0 | 15% HCl | N80 | 0.023[1] | 2 |
| 13 | ACI | 1.0 | 15% HCl | N80 | 0.029 | 2 |
| 14 | ACI w/KI | 1.0 | 15% HCl | N8 | 0.028[1] | 2 |

[1]Formulation with KI was unstable.

The Table I and Table II data demonstrate that the iodine salts are not effective corrosion inhibitor intensifiers when applied in a formulation. (Note the results of Tests 12 and 14 were achieved only after agitation of the unstable formulation.) This means that the corrosion inhibitor and intensifier, for best results, must be added separately to the acid solution. On the other hand, iodine is soluble in the corrosion inhibitor formulation, permitting all of the components to be prepackaged together and added in one step. This is a significant advantage not only in the logistics of preparing, storing and transporting the ACI package, but also ensuring that the proper relative concentration of the active components are added to the acid solution. The Table II data further demonstrate the effectiveness of $I_2$ with coextenders (formic acid). Note that the ACI with $I_2$ and formic acid performed better than the ACI with only formic acid.

Additional tests were carried out using ACI (with 2 wt % $I_2$) in various acid systems comparing corrosion rates on Cr 13 and N80. These data are presented in Table III.

TABLE III

| Test No. | Acid | Corrosion Inhibitor Formulation | ACI Conc. Vol. % in Acid | Coupon | Corrosion Rate |
|---|---|---|---|---|---|
| 15 | 15% HCl | ACI w/$I_2$ | 0.2 | N80 | 0.053 |
| 16 | 15% HCl | ACI w/$I_2$ | 0.3 | N80 | 0.013 |
| 17 | Mud | ACI w/$I_2$ | 0.1 | N80 | 0.043 |
| 18 | Mud | ACI w/$I_2$ | 0.2 | N80 | 0.014 |
| 19 | 28% HCl | ACI w/$I_2$ | 0.5 | N80 | 0.076 |
| 20 | 15% HCl | ACI w/$I_2$ | 0.3 | Cr 13 | 0.032 |
| 21 | Mud | ACI w/$I_2$ | 0.2 | Cr 13 | 0.029 |
| 22 | Mud | ACI w/$I_2$ | 0.4 | Cr 13 | 0.016 |

The Table III data demonstrate the effectiveness of the $I_2$ extender in the ACI formulated for protecting chrome and steel alloy tubulars in HCl and mud acid systems.

Additional experiments were carried out to compare three modes of adding the $I_2$ to the acid solution: (1) $I_2$ in blend with ACI formulation, (2) direct addition of $I_2$ into the acid, and (3) $I_2$ in solvent.

The ACI formulation used in these experiments had the following compositions:

TABLE IV

| | ACI Samples (wt %) | | | |
|---|---|---|---|---|
| | ACI-1 | ACI-2 | ACI-3 | ACI-4 |
| Quaternary Compound | 9[1] | 9[2] | 9.6[3] | 9.6[4] |
| Solvent | 56 | 56 | 55.4 | 55.4 |
| Surfactant | 10 | 10 | 10 | 10 |
| Acetylenic Alcohol | 25 | 25 | 25 | 25 |

[1]Quinoline/methyl Naphthyl Chloride Quaternary
[2]Quinoline/Benzyl Chloride Quaternary Ammonium
[3]Calcium/Quinoline/Methyl/Chloride Quaternary ammonium
[4]Calcium/Quinoline/Benzyl Chloride Quaternary Ammonium Corrosion coupon tests using the ACI samples of TABLES IV and VI with the results presented in TABLES V and VII were carried out using 15% HCl on N-80 steel coupons exposed for 6 hours at 250° F.

TABLE V

| Test Mode | Extender (Wt %) of ACI Formul. | Corrosion Rate (lb/sq. ft.) | | | |
|---|---|---|---|---|---|
| | | ACI-1 | ACI-2 | ACI-3 | ACI-4 |
| No $I_2$ | 0 | 0.024 | 0.049 | 0.009 | 0.016 |
| $I_2$ in ACI Blend | 2 | 0.009 | 0.036 | 0.007 | 0.013 |
| $I_2$ added directly to Acid[1] | 2 | 0.009 | 0.025 | 0.007 | 0.012 |
| $I_2$ in IPA added to Acid[1] | 2 | 0.008 | 0.024 | 0.007 | 0.014 |
| KI added directly to Acid[1] | 2.6 | 0.008 | 0.017 | 0.008 | 0.012 |

[1]ACI separately added

The ACI samples of TABLE IV included acetylenic alcohol. Additional ACI samples were prepared that were acetylenic alcohol free. These samples had the composition shown in

TABLE VI

|  | Samples | | | |
| --- | --- | --- | --- | --- |
|  | ACI-5 | ACI-6 | ACI-7 | ACI-8 |
| Quaternary Compound | 36[1] | 36[2] | 38.6[3] | 38.6[4] |
| Solvent | 54 | 54 | 51.4 | 51.4 |
| Surfactant | 10 | 10 | 10 | 10 |

[1]Quinoline/methyl Naphthyl Chloride Quaternary
[2]Quinoline/Benzyl Chloride Quaternary Ammonium
[3]Calcium/Quinoline/Methyl Naphthyl/Chloride Quaternary ammonium
[4]Calcium/Quinoline/Benzyl Chloride Quaternary Ammonium]

TABLE VII

| | Corrosion Rate (lb/sq. ft.) | | | | |
| --- | --- | --- | --- | --- | --- |
| | Extender (Wt %) of ACI | Corrosion Rate (lb./sq. ft.) | | | |
| Test Mode | Formulation | ACI-5 | ACI-6 | ACI-7 | ACI-8 |
| No $I_1$ | 0 | 0.094 | 0.023 | 0.107 | 0.031 |
| $I_2$ in ACI Blend | 2 | 0.021 | 0.017 | 0.011 | 0.026 |
| $I_2$ added directly to acid[1] | 2 | 0.024 | 0.015 | 0.012 | 0.026 |
| $I_2$ in IPA adduct | 2 | 0.018 | 0.017 | 0.014 | 0.026 |
| KI added directly to acid[1] | 2.6 | 0.017 | 0.016 | 0.013 | 0.026 |

[1]ACI separately added

The data of TABLES V and VII reveal that the iodine performed about the same regardless of mode of addition to the acid. Specifically the iodine improved the performance of the ACI without any I and performed generally as well (within experimental error) as the ACI's and KI in the acid.

The data further demonstrate the effectiveness of the $I_2$ extender, either alone or with other extenders (e.g. formic acid) in a variety of formulations and under a variety of conditions.

What is claimed is:

1. A corrosion inhibitor formulation for use in aqueous acid solutions comprising:
   (a) a nonaqueous solvent;
   (b) from 10 to 50 wt % of an organic corrosion inhibitor dissolved in said solvent, said corrosion inhibitor being selected from the group consisting of acetylenic alcohol, quaternary ammonium compounds, and cinnamaldehyde; and
   (c) from 0.5 to 10 wt % of iodine dissolved in the solvent.

2. The formulation of claim 1 and further including an effective amount of a surfactant for dispersing the formulation in the acid solution.

3. The formulation of claim 2 and further including from 0 to 30 wt % of formic acid.

4. The formulation of claim 1 wherein said nonaqueous solvent is selected from the group consisting of alcohols, aromatic hydrocarbons, aprotic solvents, and mixtures thereof.

5. A corrosion inhibitive acidizing solution for contacting metal, comprising:
   (a) an aqueous acid solution;
   (b) a non-aqueous solvent;
   (c) from 10 to 50 wt % of an organic corrosion inhibitor dissolved in said solvent, said corrosion inhibitor being selected from the group consisting of acetylenic alcohol, quaternary ammonium compounds, and cinnemaldehyde; and
   (d) iodine dissolved in said solvent, wherein said corrosion inhibitor is present in an amount ranging from 0.1 to 20 wt % of the acid solution and said iodine is present in an amount ranging from 0.001 to 1.0 wt % of the acid solution.

6. The acidizing solution of claim 5 wherein the acid solution is selected from the group consisting of HCl, HF, and mixtures thereof.

7. The acidizing solution of claim 5 wherein said solution further comprises formic acid.

8. The acidizing solution of claim 5 wherein said solution further comprises a surfactant.

9. A method of acidizing a subterranean formation wherein a corrosion inhibitor containing an extender is dissolved or dispersed in an aqueous acid solution and is pumped down a metal pipe and into the formation, the improvement wherein the extender is an effective amount of iodine for extending the corrosion inhibiting effect of said corrosion inhibitor.

10. The method of claim 9 wherein the iodine is dissolved or dispersed in the aqueous acid solution by first dissolving the iodine in a nonaqueous solvent and then dissolving or dispersing the solvent in the aqueous acid solution.

11. The method of claim 10 wherein the nonaqueous solvent containing the iodine further includes an effective amount of a surfactant for dispersing the solvent and iodine in the acid solution.

12. A method of acidizing a subterranean formation penetrated by a well having tubing therein which comprises:
   (a) injecting through the tubing and into the formation an aqueous acid solution; and
   (b) introducing into said aqueous acid solution an effective amount of a formulation to protect the tubing from corrosion, said formulation comprising
      (i) a nonaqueous solvent selected from the group consisting of alcohols, aromatic hydrocarbons, aprotic solvents, and mixtures thereof,
      (ii) from 10 to 50 wt % of an organic corrosion inhibitor dissolved in the solvent, said corrosion inhibitor being selected from said group consisting of acetylenic alcohol, quaternary ammonium compounds, and cinnamaldehyde corrosion inhibitors, and
      (iii) from 0.5 to 10 wt % of iodine dissolved in the solvent.

* * * * *